(12) United States Patent
Lai

(10) Patent No.: US 6,400,049 B1
(45) Date of Patent: Jun. 4, 2002

(54) COOLING FAN

(76) Inventor: Phill Lai, 12F., No. 140, Chung Hua Rd., Shu Lin City, Taipei Hsien (TW)

( * ) Notice: Subject to any disclaimer, the term of this patent is extended or adjusted under 35 U.S.C. 154(b) by 0 days.

(21) Appl. No.: 09/745,929

(22) Filed: Dec. 26, 2000

(51) Int. Cl.[7] .......................... H02K 7/14; H02K 11/00; H02K 5/00; H02K 1/06
(52) U.S. Cl. ...................... 310/67 R; 310/58; 310/91; 310/42; 310/68 R
(58) Field of Search ................ 310/67 R, 91, 310/42, 62–63, 217, 68 R, 71, 40 MM

(56) References Cited

U.S. PATENT DOCUMENTS

| | | | | |
|---|---|---|---|---|
| 4,110,879 A | * | 9/1978 | Burke, Jr. .................. 29/25.42 |
| 4,291,863 A | * | 9/1981 | Gachot ........................ 251/214 |
| 4,898,759 A | * | 2/1990 | Hoover et al. ................. 428/99 |
| 5,139,467 A | * | 8/1992 | Carpenter .................... 475/235 |
| 5,343,104 A | * | 8/1994 | Takahashi et al. ......... 310/67 R |
| 5,363,003 A | * | 11/1994 | Harada et al. ............ 310/67 R |
| 5,610,458 A | * | 3/1997 | Baker et al. ............. 310/68 R |
| 5,952,760 A | * | 9/1999 | Miyazawa et al. .......... 310/194 |

* cited by examiner

*Primary Examiner*—Tran Nguyen
(74) *Attorney, Agent, or Firm*—Bacon & Thomas, PLLC

(57) ABSTRACT

A cooling fan includes a circuit board fixedly mounted inside a housing around a shaft to hold a fixed winding assembly, a fan blade assembly coupled to the shaft of the housing, the fan blade assembly having a countersunk hole at the center of the hub thereof, an axle bearing secured to the shaft of the housing to support rotation of the fan blade assembly on the shaft, and a ring magnet fixedly mounted inside the fan blade assembly for enabling the fan blade assembly to be rotated on the shaft upon connection of electricity to the winding assembly.

1 Claim, 5 Drawing Sheets

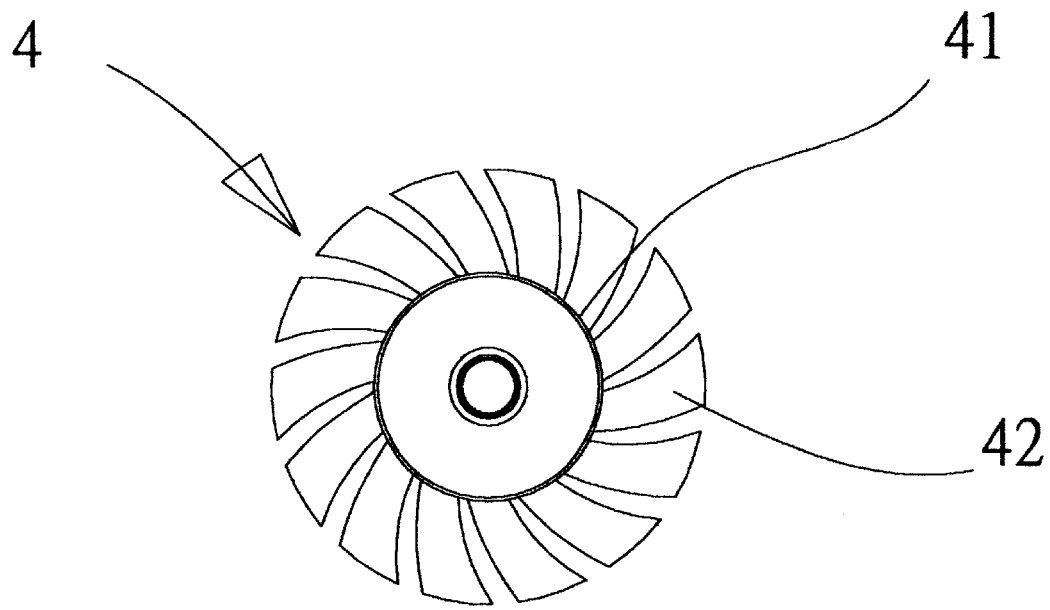
FIG. 4A
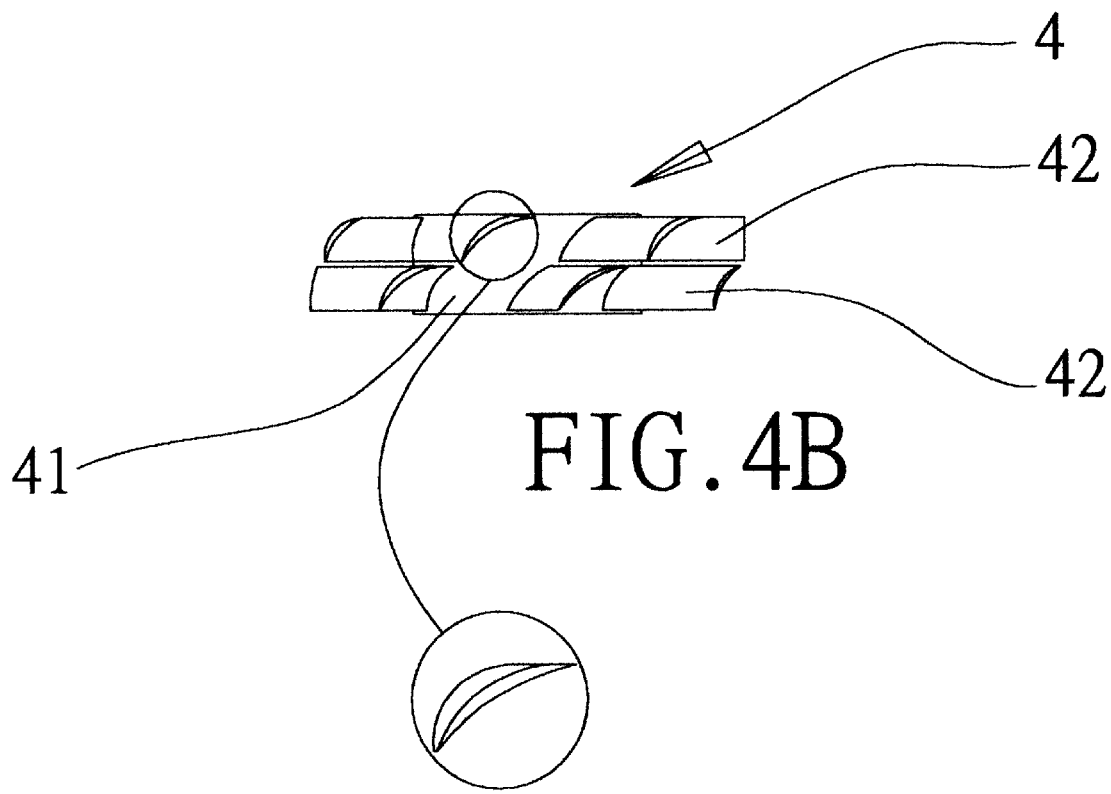
FIG. 4B
FIG. 4C

COOLING FAN

BACKGROUND OF THE INVENTION

The present invention relates to a cooling fan and, more particularly, to a high performance of cooling fan, which produces little noise during its operation.

In a computer or electronic apparatus, a cooling fan may be used with a heat sink to dissipate heat from the CPU. FIG. 1 shows a prior art cooling fan for this purpose. This structure of cooling fan comprises a housing, a winding assembly 81 mounted inside the housing, and a fan blade assembly 82 mounted inside the housing around the winding assembly 81. When electricity is connected to the winding assembly 81, a magnetic field is induced to rotate the fan blade assembly 82. The fan blade assembly comprises a center rod 83 coupled to a part inside the housing. Because the center rod 83 receives much heat during the operation of the cooling fan, the connection area between the center rod and the housing wear quickly with use, thereby causing the center rod to vibrate. When the center rod vibrates during the operation of the cooling fan, the rotation of the fan blade assembly becomes unstable, and much noise is produced.

SUMMARY OF THE INVENTION

The present invention has been accomplished to provide a container basket, which eliminates the aforesaid problem. According to one aspect of the present invention, the cooling fan comprises a circuit board fixedly mounted inside a housing around a shaft to hold a fixed winding assembly, a fan blade assembly coupled to the shaft of the housing, the fan blade assembly having a countersunk hole at the center of the hub thereof, an axle bearing secured to the shaft of the housing to support rotation of the fan blade assembly on the shaft, and a ring magnet fixedly mounted inside the fan blade assembly for enabling the fan blade assembly to be rotated on the shaft upon connection of electricity to the winding assembly. Because the hub of the fan blade assembly is supported on the axle bearing, the rotation of the fan blade assembly is stable. According to another aspect of the present invention, the fan blade assembly comprises two sets of blades radially extended from the hub and alternatively arranged at different elevations.

BRIEF DESCRIPTION OF THE DRAWINGS

FIG. 4A is a top plain view of the fan blade assembly for the cooling fan according to the present invention.

FIG. 4B is a side plain view of the fan blade assembly for the cooling fan according to the present invention.

FIG. 4C is an enlarged view of a part of FIG. 4B.

DETAILED DESCRIPTION OF THE PREFERRED EMBODIMENT

Figure 1:
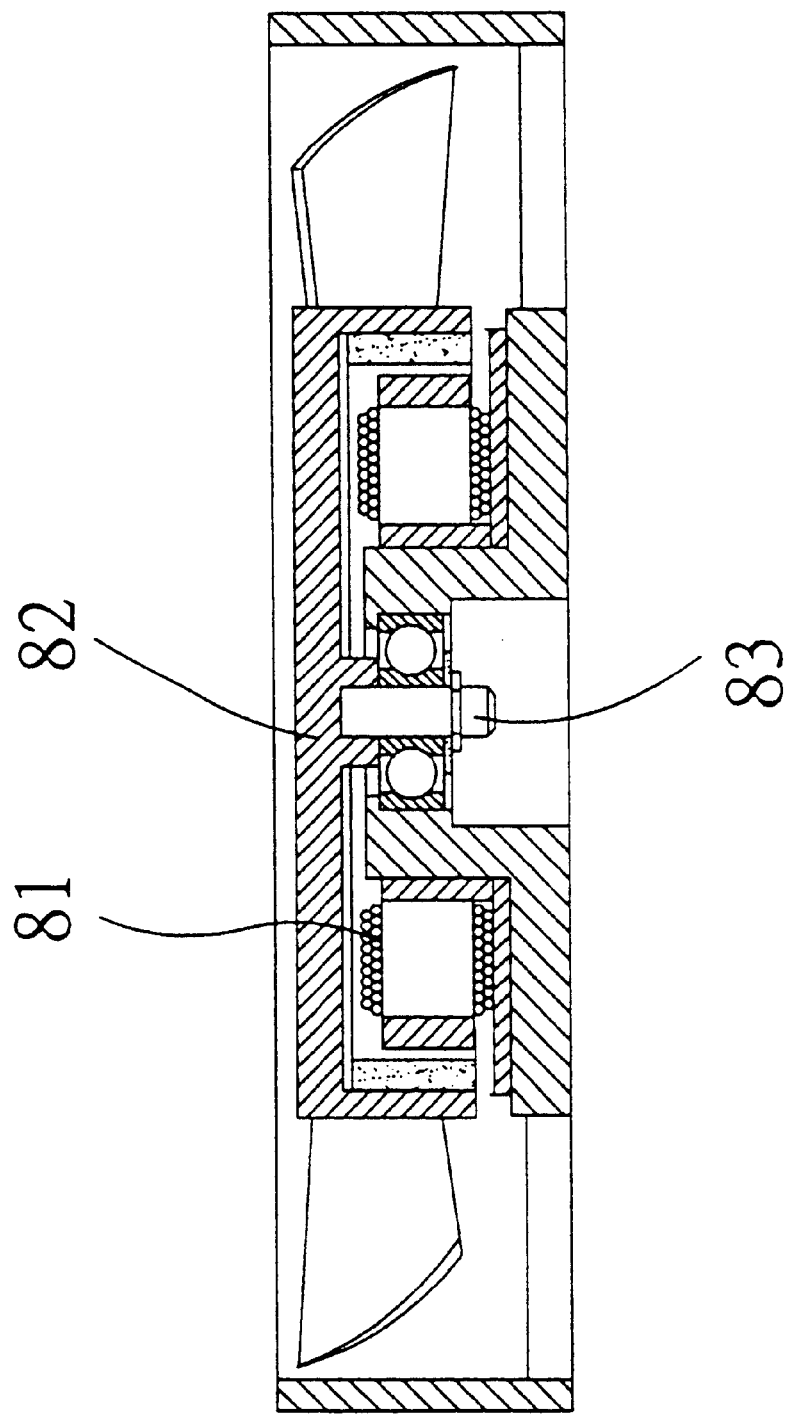
FIG. 1 is a sectional view of a cooling fan according to the prior art.

Referring to FIGS. from 1 through 3, a cooling fan is shown comprised of a housing 1, a circuit board 21, a winding assembly 2, a ring magnet 3, and a fan blade assembly 4.

The housing 1 comprises a center shaft 11 suspended at the center of a circular open chamber defined therein, and two mounting rods 12 spaced from the center shaft 11 at two sides within the circular open chamber. The center shaft 11 has an annular groove 111 around the periphery near the top end thereof. The circuit board is mounted on the shaft 11, having two mounting holes 211 respectively fastened to the mounting rods 12 of the housing 1. The winding assembly 2 is fixedly mounted on the circuit board 21 around the shaft 22.

Figure 3:
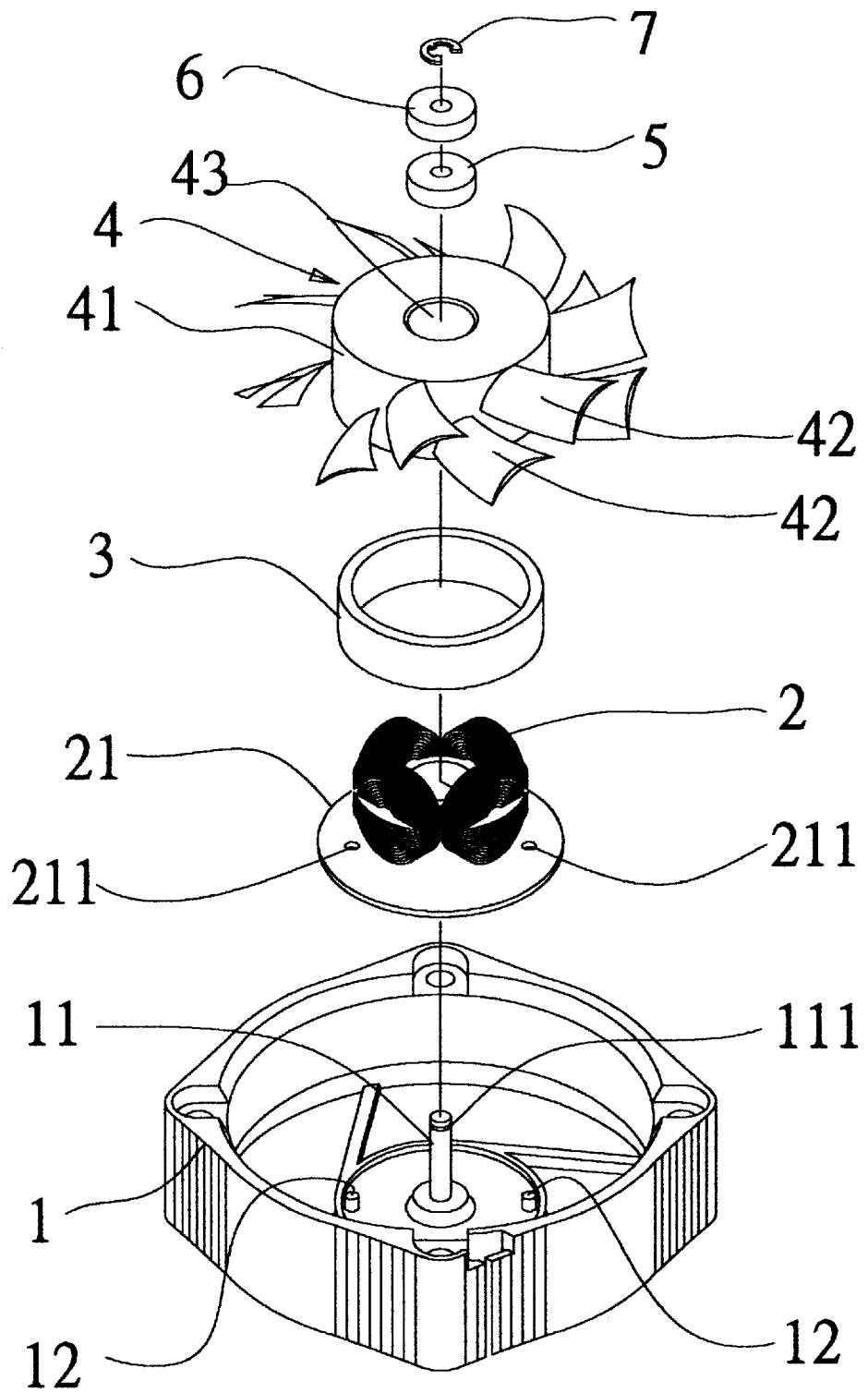
FIG. 3 is an exploded view of a cooling fan according to the present invention.

Referring to FIG. 4 and FIG. 3 again, the fan blade assembly 4 comprises a hub 41 coupled to the center shaft 11 and covered over the ring magnet 3 and the winding assembly 2, and two sets of blades 42 radially extended from the periphery of the hub 41 and alternatively arranged at different elevations. The hub 41 has a countersunk center hole 43, through which the center shaft 111 passes.

Figure 2:
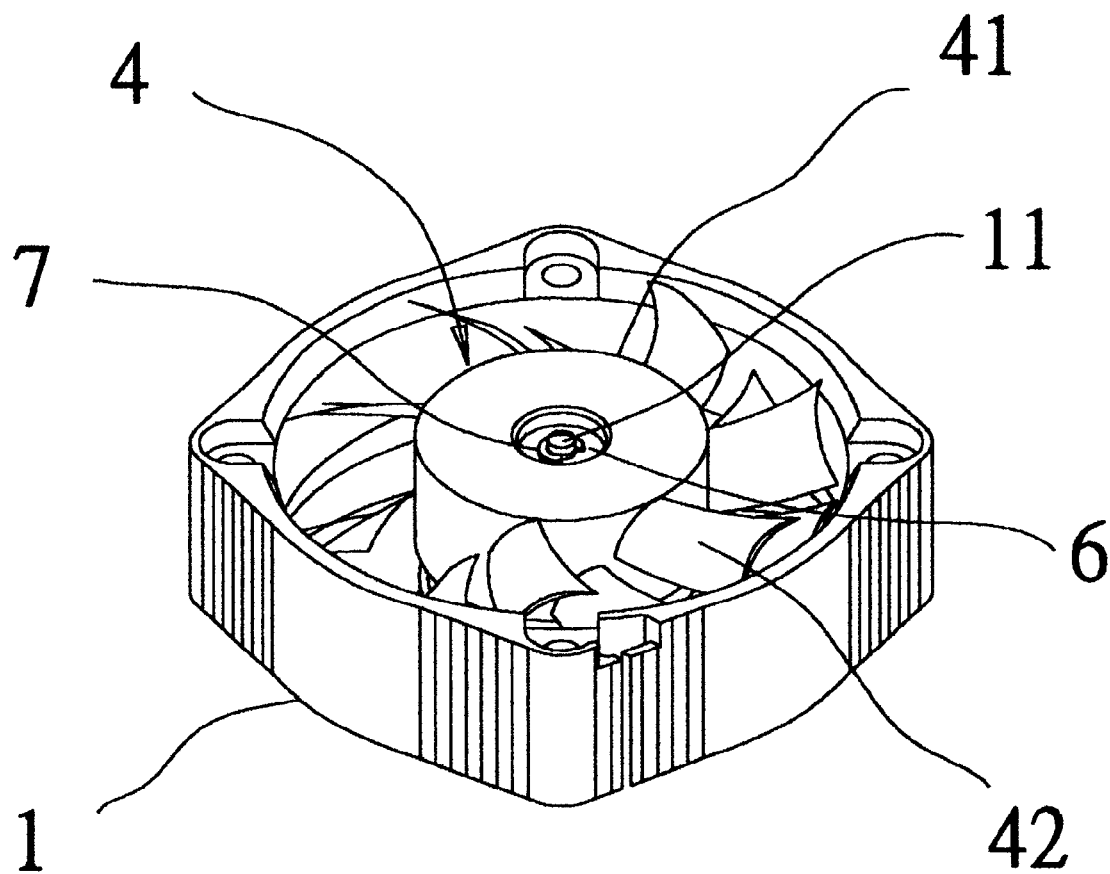
FIG. 2 is an elevational view of a cooling fan according to the present invention.
Figure 5:
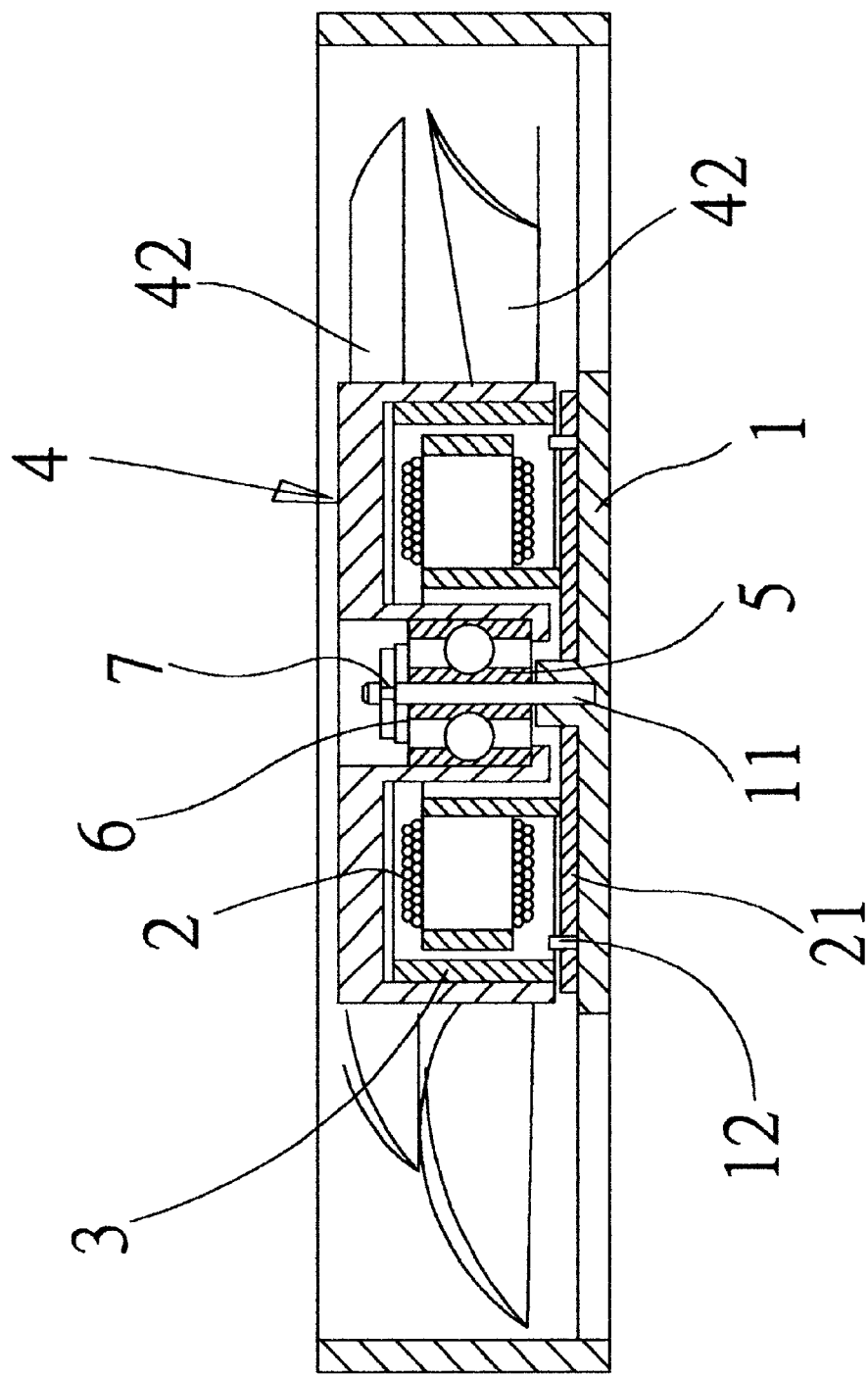
FIG. 5 is a sectional view of the cooling fan according to the present invention.

Referring to FIG. 5 and FIGS. 2 and 3 again, the ring magnet 3 is fixedly mounted inside the hub 41 of the fan blade assembly 4. After installation of the circuit board 21 and the winding assembly 2 in the housing 1 around the shaft 11, the fan blade assembly 4 and the ring magnet 3 are coupled to the shaft 11 and covered over the winding assembly 2, and then an axle bearing 5 is mounted in the countersunk hole 43 of the hub 41 around the shaft 11, and then a washer 6 is mounted in the countersunk hole 43 of the hub 41 and supported on the axle baring 5 within the countersunk hole 43, and a C-shaped retainer 7 is fastened to the annular groove 111 of the shaft 11 to secure the fan blade assembly 4 and the axle bearing 5 in place. After installation, the axle bearing 5 is disposed in contact with the periphery of the countersunk hole 43 of the hub 41 to support rotary motion of the fan blade assembly 4. When electricity is connected to the winding assembly 2, a magnetic field is induced to rotate the ring magnet 3 and the fan blade assembly 4. Because the hub 41 of the fan blase assembly 4 is supported on the axle bearing 5 at the shaft 11, the rotation of the fan blade assembly 4 is stable.

While only one embodiment of the present invention has been shown and described, it will be understood that various modifications and changes could be made thereunto without departing from the spirit and scope of the invention disclosed.

What the invention claimed is:

1. A cooling fan comprising:

a housing, said housing comprising a center shaft suspended at the center of a circular open chamber defined therein, and two mounting rods spaced from said center shaft at two sides within said circular open chamber, said center shaft having an annular groove around the periphery thereof;

a circuit board mounted on said center shaft inside said circular open chamber of said housing, said circuit board comprising two mounting holes respectively fastened to said mounting rods of said housing;

a winding assembly fixedly mounted on said circuit board around said shaft;

a fan blade assembly adapted to turn about said shaft, said fan blade assembly comprising a hub coupled to said center shaft of said housing, and two sets of blades radially extended from the periphery of said hub and alternatively arranged at different elevations, said hub having a countersunk center hole coupled to said center shaft;

a ring magnet fixedly mounted in said hub of said fan blade assembly and driven to rotate with said fan blade assembly about said center shaft upon connection of electricity to said winding assembly;

an axle bearing mounted on said center shaft within said countersunk hole to support said hub of said fan blade assembly on said center shaft;

a washer mounted on said center shaft and supported on said axle bearing in said countersunk hole; and a C-shaped retainer fastened to the annular groove of said center shaft to secure said washer and said axle bearing to said center shaft inside said countersunk hole.

\* \* \* \* \*